Jan. 13, 1959  A. V. APPEL ET AL  2,868,960
INSTRUMENT DIAL ILLUMINATOR
Filed Feb. 7, 1956

INVENTORS
ARTHUR V. APPEL
ROBERT E. LEWIS
BY
ATTORNEYS

United States Patent Office 2,868,960
Patented Jan. 13, 1959

2,868,960

INSTRUMENT DIAL ILLUMINATOR

Arthur V. Appel and Robert E. Lewis, Chicago, Ill., assignors to the United States of America as represented by the Secretary of the Air Force Application February 7, 1956, Serial No. 564,095

2 Claims. (Cl. 240—2.1)

This invention relates to illuminating systems for aircraft instruments and more particularly to an improved system wherein light is conducted from a single source and distributed to desired points through the medium of special light conducting means.

An object of the invention is the provision of a means for conducting and distributing light to a plurality of locations from a single light source.

A further object of the invention is the provision of light conducting means for distributing a uniform illumination evenly and without glare over an instrument dial from a common initial light source.

A further object of the invention is the provision of a special lighting system for aircraft or other instrument panels wherein advantage is taken of the light conductivity of certain pliable plastic materials such as Lucite and other plastics.

A further object of the invention is the provision of a special shape and arrangement of a plurality of plastic light guides which make possible a stacked formation thereof, with the light receiving ends presenting a solid light receiving area placed in proximity to a single light source whereby the light from this area can be fanned out and conducted to various desired spaced locations.

A further object of the invention is the provision of plastic light guides which are pliable and can be bent around the mechanism of an instrument without interfering with its placement or operation, conducting light from a source behind a dial to be illuminated.

The primary requirement for the material is that it have low light absorption and that it be transparent to the wave length of the light that is to be transmitted. Another requirement is that the material be pliable. Many materials fit the first condition such as quartz, Plexiglas and clear glass, and a few plastics such as Lucite and certain other acrylic plastics fulfill both conditions.

Other objects and advantages will become apparent from the following description and accompanying drawings in which.

Figure 1:
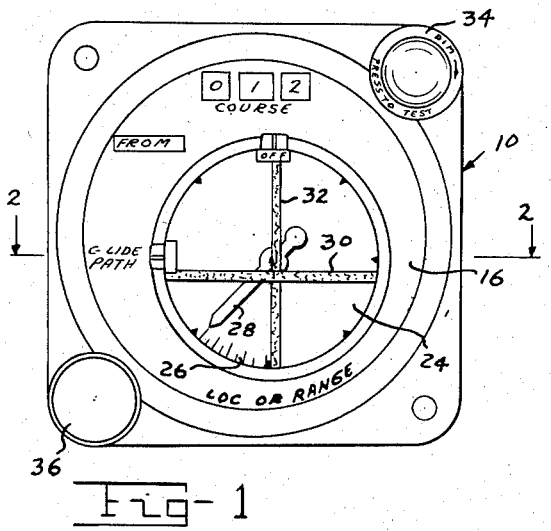
Fig. 1 is a face view of a standard aircraft beam approach indicator having the specially devised lighting system incorporated therein.
Figure 5:
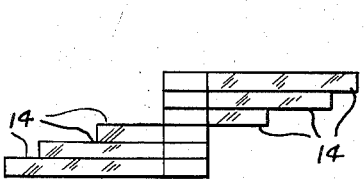
Fig. 5 is a top plan view showing diagrammatically the light guides in their stacked and flattened out condition for light distribution before bending to suit the curvature of the peripheral portion of the face plate.
Figure 6:
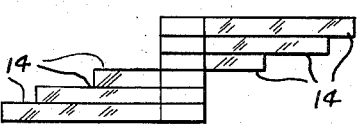
Fig. 6 is an end elevational view on a reduced scale of the stacked light guides in the condition shown in Fig. 5.

Referring more in detail to the drawings, an aircraft beam approach indicator 10 is shown in Fig. 1, the beam approach indicator being chosen to be representative of any instrument where illumination of a dial or face of the instrument is desired. A single or common light source is indicated at 12 and may be of any desired type or form. The ends of a series of light guides 14 are stacked in superimposed relation and positioned in front of the light source 12. These light guides are preferably rectangular in cross section. They are long, narrow, flexible and ribbon-like and are of sufficient length to conduct the light from the light source to a dial 16 which is to be illuminated. The material of the light guides 14 is Lucite, or any other of the acrylic plastics or in fact any material possessing the required characteristics. They are stacked, as best shown in Figs. 3, 5 and 6 and placed so that their stacked ends present an uninterrupted light receiving surface or area.

The face plate 16 is also made of the same or similar light conducting material. The light guides abut the back edge of the face plate at an angle of about 90°. The periphery of the face plate is beveled, as shown at 17, to an angle of approximately 45° thus forming a circular prism, redirecting the light from the guides and diffusing it into the face plate. The front surface of the face plate may be shielded by any opaque means such as the shield 18 provided with suitable sight openings.

Figure 3:
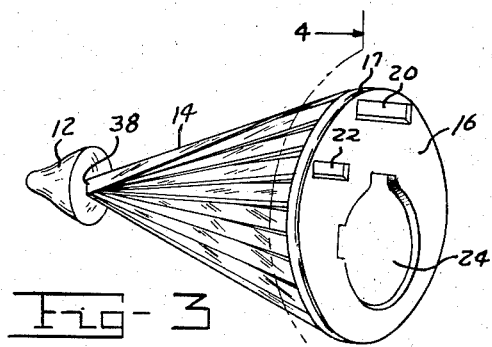
Fig. 3 is a schematic showing of the instrument light distributing face plate, light guides and common light source.

As shown best in Figs. 1 and 3, the face plate 16 is provided with openings 20, 22 and 24. These points represent any area wherever it is desired to "draw off" or distribute the light and direct it to a surface such as indicator devices to be illuminated. The openings 20 and 22 and the principal opening 24 have inwardly curved or otherwise specially prepared edges for emitting light and illuminating certain required dials, pointers and indicia. In the instrument shown, these are, in part, the dial face 24 provided with the indicating scale 26, the indicating hand 28, and the independently moving horizontal and vertical bars or elements 30 and 32 which indicate position of the aircraft during a landing approach with reference to the proper glide path or beam.

Other conventional portions of the instrument are the protecting transparent plate 19 and the adjusting knob 34.

Figure 4:
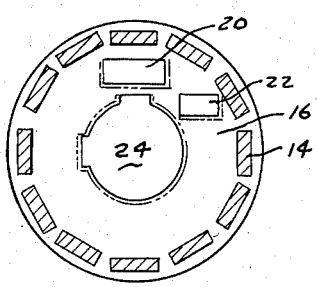
Fig. 4 is a transverse section taken substantially on the plane indicated by line 4—4 of Fig. 3 looking toward the instrument light distributing face plate.
Figure 2:
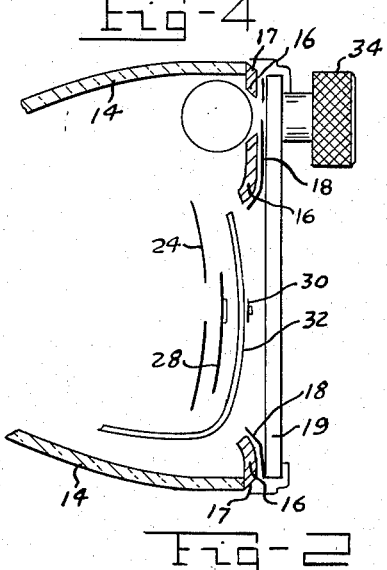
Fig. 2 is a schematic fragmentary cross section view of Fig. 1 taken substantially on line 2—2 of Fig. 1, looking in the direction of the arrows.

As shown in Figs. 3 and 4, the light guides in the form of strips are stacked together at their light receiving ends 38. The light enters the ends from a common light source, is conducted through the length of each strip and emerges only at the other end of the strip, where it is transmitted into the face plate 16 and diffused into the plate by means of the prism 17. As shown in Fig. 3, the light guides are flared or fanned out as a deck of cards would be flared, and are curved or twisted in such a way that they meet the rear surface at the outer edge of the face plate at distributed intervals.

Figs. 3 and 5 show the fanned-out light conducting means for half or a portion of the face plate 16. The other half or remaining portion is, of course, illuminated in the same way receiving its light from the same or a common concentrated light source, although a light source for each set or stack of light guides could be employed. Fig. 4 shows the distribution of the outer ends of the light guides 14, around the circumference of the rear surface of the face plate 16. The pliability of the guides makes it possible to bend or deform them around the operating components of the instrument without interfering with the placement or operation of such components. A certain amount of bending up to a "critical angel" will not impair the light conducting characteristics of the guides. This is of very great importance since they can be bent and in some instances heated to set the curvature for accommodating the internal mechanism of the instrument without displacement or interference with the operation thereof. In the beam indicator shown by way of example, the horizontally and vertically movable indicating bar elements, which move across the face of the dial to indicate the position of the aircraft relative to the glide path, are actuated by mechanism which is not shown.

It will also be seen that the illumination provided for the instrument is uniformly distributed around and from the peripheries of the openings in the face plate inwardly and reawardly and therefore no glare and no shadows are present which shadows would ordinarily be present if the dial were lighted by the conventional light bulb. It will thus be seen that the common light source may be placed a considerable distance rearwardly from the dial or other place where the illumination is to be distributed.

It is within the scope of the invention to dispense with the face plate and bend the emitting end of each light guide so that the light issuing therefrom illuminates a dial directly.

For purposes of exemplification, particular embodiments of the invention have been shown and described according to the best present understanding thereof. However, it will be apparent that many changes and modifications in the arrangement and construction of the parts thereof may be resorted to without departing from the true spirit and scope of the invention.

We claim:

1. A lighting system for illuminating instrument dials comprising a source of light positioned behind said dials, flexible, plastic light conductors of long, narrow, ribbon-like formation fanned out from said light source, a continuous light receiving surface on said light conductors for receiving light from said light source comprising stacked ends of said light conductors having surface to surface contact, dispersed forward ends on said light conductors, means for receiving light from said forward dispersed ends and diffusing and transmitting it for illuminating said dials, said means comprising a light conducting face plate, a peripheral prism edge on said face plate so angled as to receive light from said light conductors and diffuse it throughout said plate, said plate being provided with openings, edge surfaces in said plate surrounding said openings for transmitting light and illuminating selected portions of said dials.

2. An illuminated instrument panel comprising a plurality of instrument dials to be illuminated, a light conducting face plate positioned in front of said instrument dials, openings in said plate surrounding said dials for transmitting light to and illuminating said dials, an angular peripheral edge on said plate forming a prism, a plurality of flexible light conducting elements having at least two sides parallel for conducting light from a distant and rearward source, an uninterrupted light absorbing surface formed by intimately contacting stacked ends of said light conductors, forward contacting ends on said elements for contacting the rear surface of said plate, whereby light is conducted from a source by said conducting elements transmitted through said prism, diffused by said prism through said face plate and transmitted onto said dials through the edges of said openings.

References Cited in the file of this patent

UNITED STATES PATENTS

| | | |
|---|---|---|
| 1,751,584 | Hansell | Mar. 25, 1930 |
| 2,227,861 | Petrone | Jan. 7, 1941 |
| 2,259,910 | Rylsky | Oct. 21, 1941 |
| 2,286,014 | Rowe | June 9, 1942 |
| 2,333,492 | Ridge | Nov. 2, 1943 |
| 2,413,848 | Simpson | Jan. 7, 1947 |
| 2,737,744 | Sturges et al. | Mar. 13, 1956 |
| 2,770,712 | Dros | Nov. 13, 1956 |

FOREIGN PATENTS

| | | |
|---|---|---|
| 607,923 | Great Britain | Sept. 7, 1948 |